Figure 1:
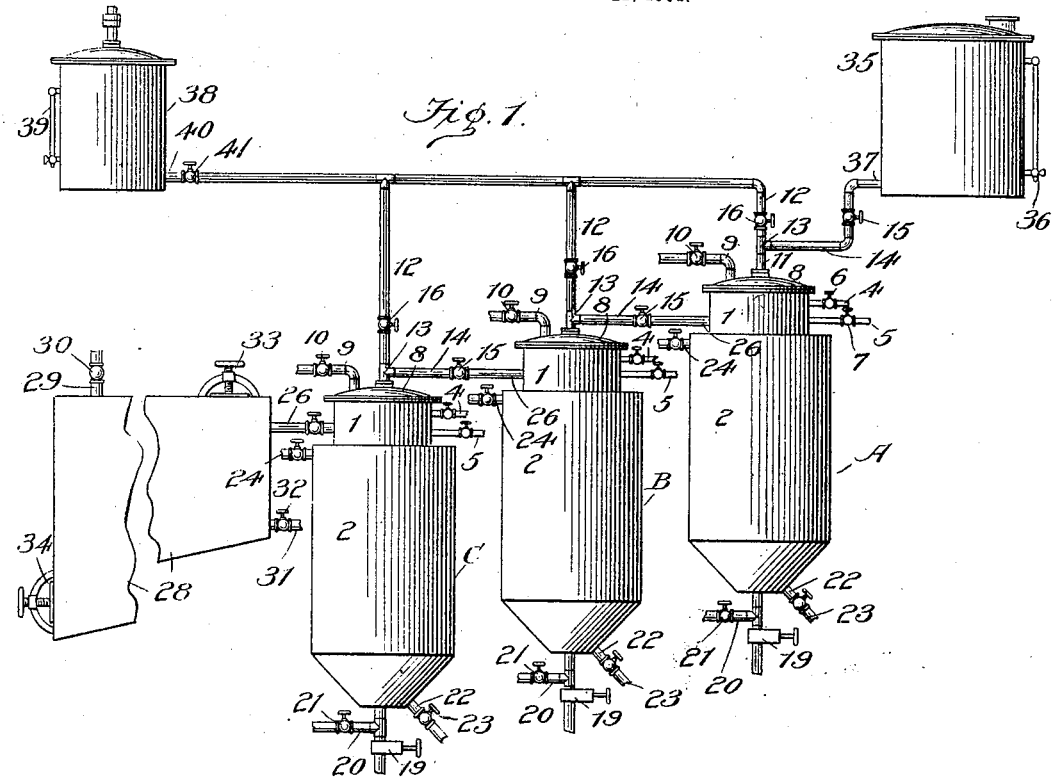

No. 809,086. PATENTED JAN. 2, 1906.
H. S. BLACKMORE.
PROCESS OF EXTRACTING SULFUR FROM THE SULFUR CONTAINING CONSTITUENTS OF PETROLEUM.
APPLICATION FILED DEC. 12, 1904.

Witnesses
Edwin L. Bradford
H. N. Jenkins

Inventor
Henry Spence Blackmore

UNITED STATES PATENT OFFICE.

HENRY SPENCER BLACKMORE, OF MOUNT VERNON, NEW YORK, ASSIGNOR, BY DIRECT AND MESNE ASSIGNMENTS, TO BLACK-FORD UTILITY OIL COMPANY, A CORPORATION OF THE DISTRICT OF COLUMBIA.

PROCESS OF EXTRACTING SULFUR FROM THE SULFUR-CONTAINING CONSTITUENTS OF PETROLEUM.

No. 809,086.      Specification of Letters Patent.      Patented Jan. 2, 1906.

Application filed December 12, 1904. Serial No. 236,420.

*To all whom it may concern:*

Be it known that I, HENRY SPENCER BLACKMORE, a citizen of the United States, residing at Mount Vernon, in the county of Westchester and State of New York, have invented certain new and useful Improvements in Processes of Extracting Sulfur from the Sulfur-Containing Constituents of Petroleum, of which the following is a specification.

The object of my invention is to separate sulfur from sulfur-containing petroleums and similar compounds or constituents thereof and produce hydrogen carbid by the direct formation of insoluble sulfur compounds and precipitation thereof from the liquid or fluid oils or substances or other constituents in such a manner as to facilitate the purification and effect a saving in time and labor as compared with processes for the direct absorption of sulfur from the liquid or fluid petroleums containing sulfur employed hitherto; and it consists in exposing the sulfur-containing petroleum to the action of a double carbid of hydrogen and a metal, such as a carbid of hydrogen and zinc, preferably that compound commonly known as "zinc-methid" or "zinc-methyl," ($C_2H_6Zn$ or $ZnH_6C_2$,) which compounds are commonly referred to in chemistry under the name of "metallo-organic" compounds, whereby the sulfur of the sulfur-containing petroleum or constituent thereof unites with the zinc content of the double carbid, with the liberation of the hydrogen carbid with which it is associated, which hydrogen carbid unites with the petroleum from which the sulfur has been separated.

In carrying out my invention I take a quantity of sulfur-containing petroleum and gradually add thereto a double carbid of zinc and hydrogen, commonly known as "zinc-methyl," care being taken to introduce the zinc-hydrogen carbid below the surface of the oil out of contact with the air by supplying the same from an elevated reservoir or other convenient means and thoroughly agitating the same with the sulfur-containing petroleum, the zinc-hydrogen carbid being introduced in about equivalent proportions to precipitate the sulfur content as zinc sulfid. The reaction which takes place may be illustrated by the following chemical formula or equation, which illustrates the action of zinc-hydrogen carbid on methyl sulfid—a hydrocarbon compound containing sulfur, analogous in character to the sulfur-containing petroleum:

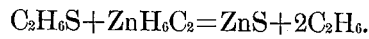

$$C_2H_6S + ZnH_6C_2 = ZnS + 2C_2H_6.$$

When methyl sulfid ($C_2H_6S$) is dissolved in an oil, such as petroleum, and exposed to the action of zinc-hydrogen carbid, ($ZnH_6C_2$), the sulfur of the methyl sulfid combines with zinc and is precipitated as zinc sulfid, while the carbon and hydrogen combine to produce ethane.

While the employment of the double carbid of zinc and hydrogen as a precipitant of sulfur from sulfur-containing oils would seem to be an expensive operation, it should be noted that the sulfur content of sulfur-containing petroleums rarely exceeds six-tenths of one per cent.

The manner in which I prefer to carry out my process may be readily understood by referring to the accompanying drawings, in which—

Figure 2:
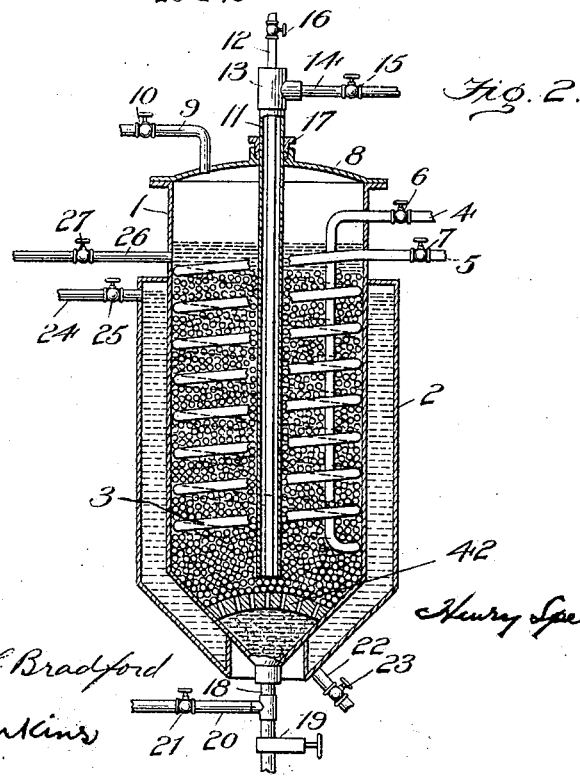

Figure 1 represents a front view or elevation of a series of communicating vessels in which the oil is purified provided with receptacles for supplying or conveying oil and purifying agent thereto and a precipitating or settling tank for receiving and separating the purified material. Fig. 2 is a transverse vertical section of one of the oil-purifying vessels.

On the drawings the numeral 1 designates a receptacle in which the oil is purified provided with the jacket 2 for containing a fluid for the purpose of abstracting heat from the reacting ingredients within the apparatus and cooling the same in cases where heat is evolved and a coil 3, provided with an inlet 4 and outlet 5, controlled by the valves 6 and 7 for the purpose of heating the reacting ingredients by passing steam therethrough in cases where heavier petroleum products are purified or substituting a current of water through the coil in place of steam when heat is spontaneously evolved. The vessel is also provided with a cover 8, having an outlet 9, controlled by the valve 10, and through which cover pass the feeding-pipes 11 and 12, the latter of which is located within the former and both of which terminate within and near the bottom of the vessel. The pipe 12 passes directly through a reducer or stuffing-box (not shown) in the T 13, while the pipe 11 communicates directly with the T 13 through the inlet-pipe 14, controlled by valve 15, the pipe 12 being also controlled by a valve 16. The pipe 11 passes into the vessel through a stuffing-box 17 in the cover thereof.

The vessel 1 is provided at its lower end with an outlet 18, controlled by a valve 19, for the purpose of discharging any impurities which may separate from the oil and precipitate in the apparatus, and also interiorly with a perforated disk 42 for the purpose of supporting a mass of separators or mixers, such as glass marbles, inert to the reacting ingredients and employed for the purpose of causing the ingredients to become thoroughly mixed in their passage up through the interstices between the same. The mixing of the ingredients supplied to the vessel through the inlet-pipes 11 and 12 is also facilitated by passing an inert gas, such as carbonic-acid gas, into and up through the vessel by means of the pipe 20, controlled by valve 21, which gas may escape through the outlet-pipe 9 upon opening the valve 10. The jacket 2 is provided with an inlet-pipe 22, controlled by valve 23, and outlet-pipe 24, controlled by valve 25. The object of having valves at both inlet and outlet of the various parts of the apparatus is for the purpose of regulating and controlling fluids which may pass therethrough in either direction, as the exigency of the case may require, be it either steam for heating or water for cooling. The ingredients conveyed into the vessel through the inlet-pipes 11 and 12 after becoming thoroughly mixed after passing up through the interstices between the small glass marbles contained in the vessels and reacting upon each other overflow through the pipe 26, controlled by the valve 27, carrying with them in suspension any solid precipitate in a finely-divided state which may have been produced, the same being retained in suspended condition by the assistance of the ebullition of the inert gas, such as carbon dioxid, passed through the vessel, the purified ingredients holding in suspension the solid products of the reaction being conveyed to a precipitating and separating tank 28, Fig. 1, which precipitating-tank is provided with a gas-outlet 29, controlled by an inward check-valve 30, and also an outlet 31, controlled by a valve 32 for drawing off the purified oil after the solid suspended matter has settled to the bottom of the tank. This settling or precipitating tank is also provided with manholes 33 and 34 for the purpose of removing the precipitate and cleaning the tank.

In carrying on my process for the purification of sulfurous petroleum with the employment of zinc-hydrogen carbid as a precipitant for the sulfur content I place the sulfur-containing petroleum in the reservoir 35, Fig. 1, provided with a liquid-gage 36 and an outlet 37, controlled by the valve 15. I also introduce into the reservoir 38, which preferably contains a portion of some light purified petroleum product, such as benzin, zinc-hydrogen carbid, (zinc-methyl,) the said receptacle being provided with the liquid-gage 39 and outlet-pipe 40, controlled by valve 41. Before introducing the sulfurous petroleum and zinc-hydrogen carbid into the purifying apparatus care must be taken to displace all the air from the same by passing into and through the apparatus and communicating pipes an inert gas, such as carbonic-acid gas, which is introduced through the pipe 20, controlled by the valve 21. This prevents the loss of zinc-hydrogen carbid (zinc-methyl) by spontaneous oxidation.

The air having been discharged from the apparatus, a current of carbon dioxid is continuously passed through the vessel 1 and gradually discharged through the pipe 9, controlled by the valve 10. The sulfurous petroleum is then admitted to the vessel by opening valve 15, thereby passing through pipes 14 and 11 into the vessel 1. As soon as vessel 1 is partly filled with sulfurous oil zinc-hydrogen carbid (zinc-methyl) is gradually conveyed into the vessel through pipe 12 by opening valves 41 and 16 to vessels A, B, and C, respectively, as the sulfurous petroleum reaches the different vessels through the overflow-pipe 26, the valve 27 being open. As the zinc-hydrogen carbid enters the sulfur-containing petroleum it reacts therewith, precipitating the sulfur in the form of zinc sulfid and generating hydrocarbon, which assimilates and mixes with the purified petroleum, the zinc sulfid being held in suspension in the petroleum by the agitation caused by the passage up through the same of the inert carbon dioxid introduced through pipe 20 and passes on through the vessels A, B, and C and into the precipitating-tank 28, where the zinc sulfid is allowed to settle. When the apparatus has become sufficiently filled with petroleum supplied from the reservoir 35, which is kept filled as the oil is gradually discharged therefrom, the zinc-hydrogen carbid (zinc-methyl) is carefully fed into the vessels A, B, and C directly by opening the valves 16, so that by the time the petroleum has passed through the series of vessels and out into the precipitating or settling tank, together with its suspended zinc sulfid, the zinc-hydrogen carbid (zinc-methyl) will have been supplied to the sulfurous petroleum in proportion of approximately three pounds per pound of sulfur contained in the sulfurous petroleum. Any excess of zinc-methyl sulfid retained in the oil after purification may be readily removed by passing a current of air through the same, which oxidizes the zinc-methyl carbid, producing zinc oxid. During the passage of the sulfurous petroleum through the vessel 1, together with the zinc-hydrogen carbid (zinc-methyl) the mixture may be heated by passing steam through the coil 3 to facilitate reaction, or in cases where the lighter sulfur-containing petroleums are employed, which react more or less spontaneously and generate more or less heat, the heat may be abstracted by passing a current of water through the coil instead of steam. The jacket 2, ordinarily used for the purpose of cooling the reacting ingredients, may also be employed as a steam-jacket in cases where the heavier sulfur-containing petroleum products are being purified and the application of heat is necessary to facilitate the purifying action.

Any zinc sulfid or other precipitate which may accumulate at the lower part of the apparatus below the perforated disk 42, employed for supporting the marbles or other mixing devices, may be removed from time to time by opening the valve 19 and withdrawing a portion of the petroleum, together with the precipitate, and again closing the same as the process proceeds.

I do not desire to confine myself to the employment of the double carbid of zinc and hydrogen, but reserve the right to use other metal-hydrogen carbids or so-called "metallo-organic" compounds as a precipitant for sulfur from sulfur-containing petroleums without departing from the spirit of my invention, which consists in employing, in combination with hydrogen and carbon, a metal having such superior affinity for sulfur that it will abstract the same from the petroleums with which it is associated. Some of the other compounds may be noted, as mercury-hydrogen carbid, tin-hydrogen carbid, lead-hydrogen carbid, antimony-hydrogen carbid, &c. These metal-hydrogen carbids being of endothermic nature evolve considerable heat upon decomposition and naturally heat the oils when employed to precipitate the sulfur therein, and it is advisable in some cases to refrigerate the petroleums during the process of treatment. These double carbids are also quite unstable, and many of them are spontaneously combustible. It is therefore necessary to retain the same in closed containers and supply the substance to the sulfur-containing oil below the surface thereof, thoroughly agitating the same therewith in order to bring the compound within reacting communication without exposure to the atmosphere. One of the principal objects in employing the metal-hydrogen carbids as precipitants for sulfur from sulfur-containing petroleums is that the metal thus combined as double carbid readily mixes with or dissolves in the oil, whereby the metal content thereof is brought into close association with the petroleum. I can use or employ any available sulfur-containing hydrocarbon or sulfurous petroleum, and I can employ, as aforesaid, any metal-hydrogen carbid in place of the zinc-hydrogen carbid so long as the sulfur of the sulfur-containing hydrocarbon or sulfurous petroleum has such superior affinity for the metal content of the metal-hydrogen carbid that it is withdrawn or separated therefrom when brought in contact therewith, producing an insoluble metal sulfid which may be readily separated from the oil by allowing it to settle or precipitate and removing the petroleum by decantation, filtration, or other convenient means. I also do not desire to confine myself to the purification of petroleum as a composite composition, but reserve the right to purify any individual product of the sulfur-containing petroleum which may be or may have been separated into its individual products by fractional distillation or otherwise prior to separating the sulfur therefrom, whereby the individual ingredients of the petroleum may be purified separately instead of collectively, as is the case where the petroleum is exposed to the action of a metal-hydrogen carbid direct, and purified by the abstraction of sulfur before separation of the individual ingredients.

The term "metal-hydrogen carbid" employed in the specification and claims has reference to compounds consisting of carbon and hydrogen with a metal, such as is commonly known as the "metallo-organic compounds of metal substitution products of hydrocarbon." These fluid compounds, either gaseous or liquid, readily dissolve in and assimilate with the hydrocarbons, such as petroleum, and are easily decomposed by any sulfurous contamination with the precipitation of the metal from the metal-hydrogen carbid as a sulfid, while the purified hydrocarbon or petroleum is augmented in value by the hydrogen carbid or hydrocarbon produced as the metal is precipitated, which readily unites with the petroleum, increasing the hydrogen and carbon constituents thereof.

By the term "sulfur-containing petroleum" as employed in this specification and claims I intend to include petroleum containing sulfur under any or all conditions, either free, combined as a substitution product in hydrocarbons, or other compounds containing sulfur dissolved in or assimilated with petroleum or its constituents or sulfur-containing oil, whereby the oil, petroleum, or constituent thereof is rendered "sulfurous" in accordance with the general understanding of the term.

Having now described my invention, what I claim as new, and desire to secure by Letters Patent, is—

1. The process of removing sulfur from petroleum containing the same, which consists in exposing sulfur-containing petroleum to the action of a metal-hydrogen carbid.

2. The process of removing sulfur from petroleum containing the same, which consists in exposing the sulfur-containing petroleum to the action of zinc-hydrogen carbid.

3. The process of removing sulfur from the constituents of petroleum, which consists in exposing the sulfur-containing constituent to the action of a metal-hydrogen carbid.

4. The process of removing sulfur from the constituents of petroleum, which consists in exposing the sulfur-containing constituent to the action of zinc-hydrogen carbid.

5. The process of removing sulfur from oil containing the same, which consists in exposing the sulfur-containing oil to the action of a metal-hydrogen carbid.

6. The process of removing sulfur from oil containing the same, which consists in exposing the sulfur-containing oil to the action of zinc-hydrogen carbid.

7. The process of producing hydrogen carbid, which consists in exposing a metal-hydrogen carbid to the action of sulfurous petroleum maintained at a reacting temperature.

8. The process of producing hydrogen carbid, which consists in exposing zinc-hydrogen carbid to the action of sulfurous petroleum maintained at a reacting temperature.

9. The process of producing hydrogen carbid, which consists in mixing sulfurous petroleum with a metal-hydrogen carbid while abstracting the heat evolved, by refrigeration.

10. The process of removing sulfur from sulfurous petroleum, which consists in exposing it to the action of a metal-hydrogen carbid maintained at a reacting temperature.

11. The process of purifying petroleum, which consists in exposing petroleum to the action of a metal-hydrogen carbid.

12. The process of purifying petroleum, which consists in exposing a refrigerated petroleum to the action of a metal-hydrogen carbid.

In testimony whereof I affix my signature in presence of two witnesses.

HENRY SPENCER BLACKMORE.

Witnesses:
  C. C. WRIGHT,
  H. N. JENKINS.